United States Patent [19]

Sheratte

[11] 4,162,995

[45] Jul. 31, 1979

[54] METHOD AND COMPOSITION FOR RECLAIMING POLYURETHANE

[76] Inventor: Martin B. Sheratte, 6827 Nita Ave., Canoga Park, Calif. 91303

[21] Appl. No.: 701,672

[22] Filed: Jul. 1, 1976

[51] Int. Cl.$^2$ .................. C08J 11/00; C08G 18/00
[52] U.S. Cl. .................. 260/2.3; 260/33.4 UB; 260/33.6 UB; 260/33.8 UB; 528/76; 528/85; 521/163; 521/167
[58] Field of Search .......... 260/2.3, 2.5 BD, 77.5 AP, 260/77.5 AA, 77.5 B

[56] References Cited

U.S. PATENT DOCUMENTS

| | | | |
|---|---|---|---|
| 3,300,417 | 1/1967 | McElroy | 260/2.3 |
| 3,404,103 | 10/1968 | Matsudaira et al. | 260/2.3 |
| 3,708,440 | 1/1973 | Frulla et al. | 260/2.3 |
| 3,928,253 | 12/1975 | Thornton et al. | 260/2.3 |

FOREIGN PATENT DOCUMENTS

| | | | |
|---|---|---|---|
| 224935 | 12/1957 | Australia | 260/2.5 BD |
| 767601 | 11/1957 | Fed. Rep. of Germany . | |

*Primary Examiner*—Thomas De Benedictis, Sr.

[57] ABSTRACT

Decomposing polyurethane foams by treating such polyurethane materials with ammonia or ammonium hydroxide, preferably in the presence of a suitable organic solvent such as a glycol or polyol, or the decomposition product of a polyurethane. Treatment of the polyurethane material with ammonia or ammonium hydroxide, particularly in combination with such solvent, is carried out preferably at elevated temperature, and results in decomposition of the polyurethane. The resulting reaction product containing polyol fragments from such decomposition or depolymerization, can be incorporated with fresh polyurethane reactants, including polyisocyanate, or polyol and polyisocyanate, to produce new urethane polymer, thus permitting recovery and re-use of otherwise useless scrap polyurethane materials.

41 Claims, No Drawings

METHOD AND COMPOSITION FOR RECLAIMING POLYURETHANE

BACKGROUND OF THE INVENTION

This invention relates to recovery and re-use of scrap polyurethane, and is especially concerned with the provision of a process and composition for decomposing and dissolving polyurethane foams and adhesives, and to procedure for re-use of the resulting solution containing urethane polymer depolymerization components, for producing fresh urethane polymer.

Polyurethane foams and adhesives are extensively employed in industry at the present time. Thus, urethane polymers are employed throughout industry for the preparation of rigid, semi-rigid or soft polyurethane foam. Urethane polymers are produced basically by the reaction of a polyisocyanate, particularly diisocyanates, with hydroxyl-rich compounds containing at least two hydroxyl groups per molecule, such as glycols, polyesters, polyethers, and the like, or amine-rich compounds such as aromatic and aliphatic diamines and polyamines.

Since many urethane polymer foams are cross-linked, when preparing urethane polymer foam parts using for example metallic molds, it is particularly difficult to remove excess urethane polymer from such molds after formation of foam parts and removal thereof from the molds. Parting agents are frequently used in some industries for this purpose, and certain treating agents have heretofore been employed which soften the polyurethane foam so that excess foam on the mold can be more easily removed by hand. Treating agents of this type previously employed include superheated steam, N-methyl pyrrolidone, chlorinated hydrocarbons, and the like. However, in most applications, in spite of the use of such softening agents, some hand removal of the excess foam is necessary.

Further, the polyurethane foam manfacturing industry is known to discard millions of pounds of scrap foam annually in this country, with additional similarly substantial quantities being discarded world-wide, that is outside the United States. The chemicals contained in such scrap are lost, and no commercially successful recovery process for such chemicals has heretofore been devised.

Various procedures have been disclosed in the prior art in seeking to solve the problem of recovery of the chemicals in scrap urethane polymers. McElroy (U.S. Pat. No. 3,117,940) teaches that urethane polymers can be dissolved in amines such as diethylene triamine, or diamino toluene. However, the cost of the reagent makes this method prohibitively expensive, since approximately 0.3 pound of amine are consumed for each pound of foam, apart from excess amine which has to be used as solvent and which must be recovered by distillation. Matsudaira, et al. (U.S. Pat. No. 3,404,103) discloses addition of sodium hydroxide to the amine, to regenerate the amine solvents. This process theoretically consumes only sodium hydroxide, but in practice about 10% of the amine solvent is consumed. However, because of the high price of suitable amines, this process has also proved to be too costly in practice. U.S. Pat. No. 3,708,440 to Frulla, et al., teaches that scrap urethane foam can be dissolved in glycols in the presence of an alkanolamine, but the excessive periods of heating required have militated against the use of this process on a commercial scale.

It is an object of the present invention to provide procedure and compositions for readily decomposing polyurethane, and to prepare useful chemical mixtures or solutions from scrap polyurethane. Another object is to provide procedure for utilization of such chemical mixtures or solutions for preparing fresh polyurethane foams and resins.

DESCRIPTION OF THE INVENTION

It has been found according to the present invention that urethane polymers or resins, e.g. urethane foam scrap can be decomposed by treating or contacting the foam with ammonia or ammonium hydroxide. In preferred practice, such treatment is carried out in the presence of a suitable solvent, e.g. a glycol or polyol, as described in greater detail hereinafter. It has been found that treatment of the urethane polymer, which is generally cross-linked, with ammonia or ammonium hydroxide, preferably in a suitable solvent, as described hereinafter, causes the urethane polymer to depolymerize, and in some instances react with the solvent to form liquid products which are soluble in excess solvent.

The present invention, according to certain preferred embodiments thereof provides a method for recovering the chemicals in urethane foam scrap by contacting the foam with a suitable solvent such as a glycol, polyol or polyether, or with the decomposition product of a polyurethane foam, and at the same time treating the mixture with either gaseous ammonia, or concentrated ammonium hydroxide, or with a solution of ammonia gas, in said glycol, polyol, or solvent formed of previously decomposed polyurethane foam.

It has been found that the reaction mixtures formed during treatment of the urethane polymers with ammonia or ammonium hydroxide, causing the urethane polymers to depolymerize, contain depolymerization components such as polyols, which can be reacted with polyisocyanates to produce new urethane polymers, thus saving much urethane polymer reactant materials which are at present being discarded with the urethane polymer scrap. Thus, the invention provides for the recovery and re-use of components present in otherwise useless scrap polyurethane materials, for producing fresh urethane polymer, using readily available and economical ammonia or concentrated ammonium hydroxide as decomposing agent for the polyurethane, in a relatively short reaction period.

The urethane polymers, as previously noted are produced by reaction of polyisocyanates, particularly diisocyanates with, for example, suitable organic polyfunctional polyol reactants. A wide variety of organic diisocyanates can be used, among which are included aromatic diisocyanates, such as m-phenylene diisocyanate, p-phenylene diisocyanate, 4-t-butyl-m-phenylene diisocyanate, 4-methoxy-m-phenylene diisocyanate, 4-phenoxy-m-phenylene diisocyanate, 4-chloro-m-phenylene diisocyanate, toluene diisocyanates (either as a mixture of isomers, e.g., the commercially available mixture of 80% 2,4-toluene diisocyanate and 20% 2,6-toluene diisocyanate, or as the individual isomers themselves), polyphenyl polymethylene polyisocyanate, corresponding to the material marketed as PAPI, and other polyisocyanates.

The most important hydrogen-rich reactants for reaction with the polyisocyanates to produce polyurethanes are hydroxyl-containing compounds such as the glycols, polyols, hydroxyl-rich polyesters and various polyethers. These include diols or polyols such as polypropylene glycol, tetramethylene glycol and its polymers, trimethylol propane and the like.

Another class of suitable organic polyfunctional polyol reactants includes polyalkylene ether polyols containing more than two reactive hydroxyl groups, such as polyalkylene ether triols, tetrols, and the like, which are prepared, for example, by reacting polyols such as glycerol, trimethylol propane, pentaerythritol, dipentaerythritol, sucrose, sorbitol and the like, or amines such as ethanolamine, ethylene diamine, diethylene triamine, and the like, with lower alkylene oxides such as ethylene oxide, propylene oxide and the like.

Polyesters containing a plurality of isocyanate-reactive hydroxyl groups constitute another class of reactive organic polyfunctional polyols which may be employed in preparing polyurethane resins. While the preparation of polyesters suitable for this purpose has been described in great detail in the prior art and forms no part of the present invention per se, it may be mentioned here by way of illustration that polyesters of this type may be prepared by the condensation of a polyhydric alcohol, generally a saturated aliphatic diol such as ethylene glycol, propanediol-1,2, propanediol-1,3, butanediol-1,3, butanediol-1,4, pentanediol-1,2, pentanediol-1,5, hexanediol-1,3, hexanediol-1,6, deithylene glycol, and the like, with a polycarboxylic acid or anhydride, generally a dicarboxylic acid or anhydride which is either saturated or which contains only benzenoid unsaturation, such as oxalic, malonic, succinic, glutaric, adipic, pimelic, suberic, azelaic, and the like, acids.

The urethane polymerization reaction is usually base catalyzed, although free-radical generating catalysts can also be employed, and employing proportions of the isocyanate and polyol components so as to obtain an equivalent number of hydroxyl or isocyanate groups.

Modifications can be made in the polyurethane reaction mixture to provide resins having various degrees of flexibility, rigidity and other properties as is well known in the art. These include varying the mol ratio of polyisocyanate to polyol and in employing tri- or higher functional polyols and polyisocyanates.

The reactants and reaction for producing polyurethanes of varying properties is well known in the art and further detailed description thereof is believed unnecessary.

As previously noted, ammonia or ammonium hydroxide can be used for decomposing the polyurethane in the absence of any solvents. Such treatment can be carried out by contacting the polyurethane with ammonia gas or with concentrated aqueous ammonium hydroxide (e.g. about 30% $NH_4OH$), preferably at elevated temperature of about 100° to about 250° C., in an autoclave. However, in preferred practice, the ammonia or ammonium hydroxide is employed in combination with a suitable solvent. Such solvents are generally high boiling liquid organic solvents having a boiling point generally of at least 100° C., such solvents preferably being high boiling compounds having a boiling point of at least about 150° C.

The solvents which can be employed in combination with ammonia or ammonium hydroxide are those compounds which generally can be incorporated into formulations as noted above, for reaction with polyisocyanates to produce polyurethane. These include particularly glycols, polyols and polyethers. Examples of these solvents are ethylene glycol, propylene glycol, polyethylene glycols, and polypropylene glycols of molecular weight about 130 to about 5,000, e.g. dipropylene glycol, copolymers of ethylene glycol and propylene glycol, adducts of propylene oxide and ethylene diamine or sorbitol, adducts of pentaerythritol with an alkylene oxide such as propylene oxide, and adducts of trimethylol propane with an alkylene oxide, e.g. the adduct of trimethol propane with propylene oxide, polyethylene oxide or polypropylene, oxide, and the like. Other suitable solvents which can be employed include monoalcohols such as n-butanol, pentanol and hexanol, and polyalcohols such as glycerol, trimethylol propane and pentaerythritol. Also, solvents such as phenols, e.g. resorcinol and o-, m- and p-cresols, or mixtures thereof such as cresylic acid are suitable. Hydrocarbons such as xylene, decane, naphthalene or tetralin, chlorinated hydrocarbons such as di- and trichlorobenzenes, and the like are suitable. The reaction mixture of previously treated urethane foams, containing polyols are also useful as solvents.

The preferred solvents are the glycols, polyols and polyethers, e.g. ethylene glycol, propylene glycol, and polyethylene and polypropylene glycols generally of molecular weight ranging from about 100 to about 5,000, e.g. diethylene glycol, dipropylene glycol and the like, and the adducts of propylene oxide with sorbitol and propylene oxide with ethylene diamine.

Ammonia gas can be bubbled through the solvent in contact with the urethane foam. Also, the ammonia can be used in aqueous solution, e.g. in the form of a concentrated ammonium hydroxide solution having about 28 to about 30% $NH_4OH$ concentration, such as the commercially available concentrated ammonium hydroxide, which is introduced into the solvent in contact with the foam, or the concentrated ammonium hydroxide can be dissolved initially in a solvent of the types described above. Alternatively, the reaction can be carried out by introducing sufficient ammonia or concentrated ammonium hydroxide initially into the solution to decompose all of the foam in contact with the solvent, without adding additional ammonia or ammonium hydroxide.

The concentration of ammonia or ammonium hydroxide in the solvent can range from about 0.1 to about 40%, by weight, and the proportion of ammonia or ammonium hydroxide, to the polyurethane foam, can range from about 0.1 to about 30%, by weight.

Treatment of the urethane polymer with the ammonia or ammonium hydroxide decomposing agent in the solvent solution thereof, for decomposition and dissolution of the urethane polymer is generally carried out at elevated temperature, generally ranging from about 100° to about 250° C., and preferably between about 150° to about 230° C. However, in the case of flexible urethane polymers, such polymers can be treated and decomposed with ammonia or ammonium hydroxide according to the invention, at ambient temperature, in the presence or absence of a solvent.

The reaction can be carried out in an autoclave, adding ammonia as gas or as solvent solutions thereof, or by incorporating concentrated aqueous ammonium hydroxide. Pressures employed can range from about 50 to about 250 psi. In preferred practice, the solvent is heated at ambient pressure while a stream of ammonia gas is passed into the solvent, and the polyurethane foam is added to the ammoniated solvent in small pieces.

The time of treatment of the urethane polymer with ammonia or ammonium hydroxide, or a solvent solution thereof, depends in large measure on the temperature of treatment and the concentration of the ammonia or ammonium hydroxide in the mixture. Thus, time of treatment can range from as little as about 10 seconds up to about 3 hours or more, and usually ranges from about 1 to about 15 minutes.

In preferred practice of the invention, a small amount of glycol or polyol is heated to a temperature between 100° C. and 250° C., and gaseous ammonia is bubbled through the hot liquid. Urethane foam is then added to the ammoniacal liquid. It continuously dissolves, and decomposes into a mixture of polyols, amines, low molecular weight urethanes and ureas, according to the chemical equations below:

$$RNHCOOR' + NH_3 \rightarrow R'OH + RNHCONH_2$$

$$RNHCONH_2 + NH_3 \rightarrow RNH_2 + NH_2CONH_2$$

$$RNHCOOR' + RNH_2 \rightarrow RNHCONHR + R'OH$$

$$RNHCONHR + NH_3 \rightarrow RNHCONH_2 + RNH_2$$

where R represents the residue of an isocyanate molecule used in the production of the foam, and R' represents the polyether residue of the polyol used for production of the foam.

In the presence of glycols or alcohols, a further reaction has been found to occur. The ammonia catalyzes an ester exchange or transesterification reaction, according to the equation:

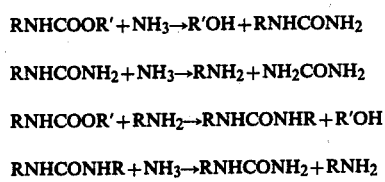

where R" represents the residue of the alcohol or glycol solvent.

As more foam is decomposed, the complex polyol-/amine/urea mixture acts as solvent for the ammonolysis reaction and for the decomposition products of the incoming foam, and a theoretically infinite quantity of foam can be decomposed starting from a relatively small quantity of glycol or polyol solvent, since the decomposing reagent is the ammonia, which is added constantly in an amount sufficient to decompose the most recently added foam.

All of the above reactions proceed simultaneously, and although one or the other may be made to predominate by appropriate choice of reaction conditions, none can be completely suppressed. The resultant mixture is therefore somewhat complex. However, it provides an excellent material for the preparation of fresh urethane foam, as will be seen from the examples below.

The decomposition of the polyurethane described above is a depolymerization reaction forming a clear solution having a first fraction of the original hydrogen-rich material, e.g., polyester, polyamine or polyol, usually polyol, employed in producing the original urethane polymer, a second fraction containing polyureas based on the original polyisocyanate employed in producing the original urethane polymer, a third fraction containing the products produced by breaking down the polyureas to amines corresponding to the original isocyanate component employed in producing the urethane polymer, and a fourth fraction comprised of polyols derived from the above transesterification reaction between the urethane foam and the glycol solvent. All these materials are reactive with isocyanates, and therefore can be incorporated as reactants for producing new polyurethane foam. Exemplary isocyanates are the polyisocyanates 2,4- and 2,6-toluene diisocyanates and polyphenyl polymethylene polyisocyanate.

Thus, when it is desired to recover and re-use the chemicals available in scrap polyurethane foam, it is desirable to design the depolymerizing solution, and to control the amount of foam dissolved in it, so that the resulting mixture may be taken directly into a foam manufacturing operation, where it may be used in its entirety, either alone or mixed with, e.g. suitable polyols, as the active hydrogen-containing fraction for reaction with polyisocyanate to produce a new foam.

However, it is noted that where the depolymerization mixture is employed for recovery and re-use in the above noted manner, and an organic solvent has been employed in combination with ammonia for decomposing the urethane polymer, such solvent should not be a material such as a phenol or alkoxy benzene, e.g. cresylic acid, methoxy benzene and the like, or other material which might tend to interfere with the subsequent polymerization reaction, or which might degrade the properties of the product of such polymerization.

The following are examples of practice of the invention:

EXAMPLE 1

One hundred grams of Voranol 350, the propylene oxide adduct of sorbitol, a typical commercial polyol used for the manufacture of rigid urethane foams, were placed in a 500 cc flask equipped with a stirrer, thermometer, gas inlet tube, and a short reflux condenser. The polyol was heated to 230° C., and a slow stream of ammonia gas was bubbled through. The polyol was stirred and 150 grams of a typical commercial rigid urethane foam of density 2.1 lb/ft$^3$ was added through the condenser. The entire 150 grams of foam was added in less than 45 minutes, and less than 5 minutes later, it had dissolved completely to yield a clear brown solution or oil, which had hydroxyl number 426.

EXAMPLE 2

The equipment described in Example 1 was assembled, with the addition of a siphon tube extending to the bottom of the vessel, and an additional funnel. 50 cc Pluracol 355, the propylene oxide adduct of ethylene diamine, another typical commercial polyol useful for the preparation of rigid urethane foams, was charged to the flask and 500 cc Pluracol 355 was placed in the addition funnel. After heating to 220° C., ammonia was admitted in a slow stream, and foam was added through the condenser as before. When 50 grams of foam had dissolved, approximately 50 grams of the mixture was removed through the siphon tube and 25 cc Pluracol 355 was added to the flask. After a further 25 grams of foam had dissolved, 50 grams of the mixture was again removed and 25 cc Pluracol 355 was again added. These steps were repeated until the entire 500 cc Pluracol 355 had been consumed, and 610 grams of foam had dissolved. This entire procedure took approximately 80 minutes. The product had hydroxyl number 550.

EXAMPLE 3

100 grams of the product from Example 1 was placed in a 500 cc flask assembled as in Example 2. The oil was heated to 220° C. and a slow stream of ammonia was bubbled through. A commercial rigid urethane foam was added at a rate of about 5 grams per minute. When 100 grams of foam had been added, the addition was interrupted for 5 minutes while the last pieces of foam dissolved. The 90 grams of the product was removed from the flask and allowed to cool to an almost solid brown stiff oil. Heating and addition of foam was resumed and continued until approximately 100 grams more had been added. Addition of foam was again interrupted for 5 minutes, and then 95 grams of product was removed. The product this time solidified to an easily distorted glass.

The above process was repeated frequently over a period of several days. Eventually the product was a brittle brown glass which softened at about 50° C. and melted to a free flowing liquid at about 80° C. The apparent hydroxyl number of this solid product was about 800. It was fully soluble in methanol, iso-propanol and n-butanol, and in typical polyols such as Voranol 350, Pluracol 355, NIAX BE 375, which is a propylene oxide adduct of a novolac, and also in triethylene glycol and in polypropylene glycols, and polyethylene glycols of molecular weight from 200 to 4000.

EXAMPLE 4

50 grams of the product from Example 1 was mixed with 15 grams Freon F-11 (trichlorofluoromethane) and then intimately mixed with 41 grams of the commercial polyisocyanate, PAPI, with amine number 160. No catalyst was used, since the dissolved foam had contained catalyst, and the foam fragments carried amine groups, which were able to enhance catalytic activity. The cellular urethane polymer formed in this reaction had a cream time of 30 seconds. The foam had a 2.2 lb/ft$^3$ density and exhibited good mechanical properties for a foam of this type.

EXAMPLE 5

40 grams of the product from Example 2 was mixed with 20 grams of the polyol NIAX-BE 375, which is a propoxylated novolac, 20 grams of Freon 11 blowing agent was added, and the polyol mixture was foamed with 84 grams PAPI with amine number 160. The mixture had a cream time of 35 seconds, and cured tack free in 3 minutes to a rigid foam with density 2.1 lb/ft$^3$, and mechanical properties typical of a foam of this nature.

EXAMPLE 6

20 grams of the final glassy product from Example 3 was dissolved in 80 grams Voranol 350. The resulting mixed polyol solution had a hydroxyl number 440. It was incorporated into the following foam formulation:

|  | Grams |
| --- | --- |
| Mixed polyols | 100 |
| Freon 11 (trichlorofluoromethane) | 30 |
| Dibutyl Tin dilaurate | 1 |
| DC 193 silicone surfactant | 1 |
| PAPI (polyisocyantate) | 93 |

The mixture exhibited a cream time of 20 seconds, and set tack-free after 150 seconds to a rigid urethane foam with density 2.05 lb/ft$^3$. The foam exhibited good mechanical properties for urethane foams with this density.

EXAMPLE 7

40 grams of Pluracol 538 which is a propylene oxide adduct of glycol (a commercial polyol used for the manufacture of flexible polyurethane foams) were placed in a 500 cc flask assembled as described in Example 1. The polyol was heated to 180° C. and a slow stream of ammonia gas was passed in. A commercial flexible urethane foam of unknown composition (obtained from the seat of a scrap automobile) was added to the hot polyol-ammonia solution at a rate of about 5 grams per minute. 200 grams of foam was dissolved in this way in about 35 minutes.

The ammonia flow was continued for a further 10 minutes, and then the mixture was subjected to vacuum distillation. About 15 grams of urea and 81 grams of mixed toluene diamines were recovered.

The non-volatile residue (155 grams) was a pale yellow oil with hydroxyl number 56. Its infrared spectrum was essentially identical with that of Pluracol 538.

EXAMPLE 8

300 grams dipropylene glycol were placed in a 1000 cc flask assembled as in Example 1. The glycol was heated to 220° C. and a slow stream of ammonia gas was bubbled through. A commercial isocyanurate foam of unknown composition was added in small pieces to the stirred solution. 250 grams was dissolved over a 3 hour period. The product was a dark viscous oil with hydroxyl number 780.

EXAMPLE 9

250 grams dipropylene glycol was heated to 210° C. in a 1000 cc flask fitted with a stirrer, condenser and ammonia inlet tube. Ammonia was bled into the glycol at a rate of about 50 cc per minute (0.04 grams per minute). A commercial rigid urethane foam of unknown composition was added to the flask through the condenser at a rate of about 2 grams per minute. The foam rapidly dissolved, and 300 grams of foam was dissolved in two hours. Heating and ammonia bubbling were continued for 15 minutes. The product was a brown oil with viscosity of about 5000 cps at room temperature, and a hydroxyl number of 355.

EXAMPLE 10

The product from Example 9 was incorporated into the following foam formulation:

|  | Grams |
| --- | --- |
| Product from Example 9 | 30 |
| Freon II | 10 |
| Dibutyl tin dilaurate | 0.1 |
| DC 193 Silicone Surfactant | 0.5 |
| PAPI (105 index) | 31.5 |

The mixture had a cream time of 15 seconds, a rise time of 90 seconds and a tack free time of 170 seconds.

EXAMPLE 11

The reaction of Example 9 was repeated except that the ammonia was added in the form of concentrated aqueous ammonium hydroxide (30%) at a rate of 0.5 cc per minute. The reaction was complete in less than two hours, and the product had hydroxyl number 450, with viscosity 2500 cps at room temperature.

EXAMPLE 12

100 grams of rigid urethane foam was placed in a stainless steel autoclave with 70 grams of propylene glycol. The autoclave was sealed and then ammonia gas was bled into the vessel to a pressure of 50 psi and the vessel was heated for two hours at 200° C. The product was a brown oil with hydroxyl number 520, and room temperature viscosity 5500 cps.

EXAMPLE 13

25 grams of a commercial rigid urethane foam of unknown composition was placed in an autoclave with 1 cc concentrated ammonium hydroxide and 10 cc polypropylene glycol (m.w. 400), and heated at 200° C. for 1 hour. The product was a stiff brown oil, with hydroxyl number 450.

EXAMPLE 14

100 grams polypropylene glycol-400 containing 10 grams of dissolved anhydrous ammonia was placed in an autoclave with 100 grams of flexible foam of a type commonly used as a packing material.

The autoclave was sealed and heated at 200° C. for 1 hour. After cooling, the vessel was found to contain 208 grams of a light brown oil with hydroxyl number 85.

This oil was incorporated into the following formulation:

|  | Grams |
|---|---|
| Oil | 100 |
| 2, 4- toluene diisocyanate | 50 |
| Freon 11 (trichlorofluoromethane) | 5 |
| Water | 3 |

The mixture had a cream time of 30 seconds and a rise and curing time of about 2 minutes. The cured foam was rather more resilient than the original foam, but was still quite flexible.

This example shows that the oil or depolymerization composition containing polyol can be reacted directly with diisocyanate to produce fresh foam.

EXAMPLE 15

100 grams of a commercial isocyanurate foam of unknown composition was crushed into a 250 cc stainless steel pressure vessel. The vessel was sealed and connected to a gaseous ammonia cylinder. Ammonia was admitted and a pressure of 100 psi was maintained while the vessel was immersed in an oil bath at 180° C. for 2 hours, with occasional rocking. The product was a viscous dark brown oil (103 grams) which had hydroxyl number 820.

EXAMPLE 16

The procedures of Example 15 were repeated using 10 cc concentrated aqueous NH4OH (30% NH4OH) in place of ammonia. The results were essentially the same as in Example 15.

From the foregoing, it is seen that the invention provides novel and efficient procedure and compositions for completely decomposing and dissolving urethane polymer, e.g. scrap or excess urethane polymer from metallic molds after formation of urethane polymer foam parts, by treatment of the urethane polymer with ammonia or ammonium hydroxide alone or in solution in certain solvents, and the solvents so employed being readily available commercial materials. There is also provided according to the invention, novel procedure for recovering and re-using the resulting solution of depolymerized urethane polymer components produced during the above-noted decomposition of urethane polymers, for recycle and recovery of the depolymerized component values, such as the polyols present in the depolymerized solution, for addition to fresh reactants for production of new urethane polymer.

While I have described particular embodiments of my invention for purposes of illustration, it will be understood that various changes and modifications within the spirit of the invention can be made, and the invention is not to be taken as limited except by the scope of the appended claims.

What is claimed is:

1. A process for decomposing polyurethane which comprises treating said polyurethane with ammonia in the absence of water, said ammonia selected from the group consisting of ammonia gas and anhydrous ammonia, completely liquefying said polyurethane, and recovering the reaction mixture.

2. A process for decomposing polyurethane which comprises treating said polyurethane with ammonia in the absence of water, said ammonia selected from the group consisting of ammonia gas and anhydrous ammonia, completely liquefying said polyurethane, and recovering the reaction mixture, said treating said polyurethane with said ammonia taking place in the presence of an organic solvent having a boiling point of at least 100° C.

3. The process as defined in claim 2, wherein said ammonia is ammonia gas.

4. The process as defined in claim 2, comprising contacting said polyurethane with said solvent while treating the mixture with said ammonia.

5. The process as defined in claim 4, wherein ammonia gas is passed into said organic solvent.

6. The process as defined in claim 1, said treating being carried out in an autoclave.

7. The process as defined in claim 2, said solvent being a compound suitable for reaction with a polyisocyanate to produce a polyurethane.

8. The process as defined in claim 2, said organic solvent selected from the group consisting of glycols, polyethers, polyols, mono- and polyalcohols, phenols, alkoxy benzenes, hydrocarbons and chlorinated hydrocarbons.

9. The process as defined in claim 2, wherein said solvent is a compound selected from the group consisting off glycols, polyols and polyethers.

10. The process as defined in claim 9, wherein said solvent is a compound selected from the group consisting of ethylene glycol, propylene glycol, and polyethylene and polypropylene glycols of molecular weight ranging from about 100 to about 5,000, and the adducts of propylene oxide with sorbitol and propylene oxide with ethylene diamine.

11. The process as defined in claim 2, the concentration of ammonia in said solvent ranging from about 0.1 to about 40% by weight of the solution.

12. The process as defined in claim 1, the proportion of ammonia to polyurethane employed ranging from about 0.1 to about 30% by weight.

13. The process as defined in claim 11, the proportion of ammonia to polyurethane employed ranging from about 0.1 to about 30% by weight.

14. The process as defined in claim 1, wherein said treating is carried out at a temperature within the range of from about 100 to about 250 degrees Centigrade.

15. The process as defined in claim 2, wherein said treating is carried out at temperature ranging from about 100° to about 250° C.

16. The process as defined in claim 2, wherein said treating is carried out at temperature ranging from about 150° to about 230° C.

17. The process as defined in claim 9, wherein said treating is carried out at temperature ranging from about 100° to about 250° C., for a period ranging from about 10 seconds to about 3 hours.

18. The process as defined in claim 9, wherein said treating is carried out at temperature ranging from about 150° to about 230° C. for a period ranging from about 1 to about 15 minutes.

19. The process as defined in claim 13, wherein said treating is carried out at temperature ranging from about 100° to about 250° C.

20. The process as defined in claim 13, wherein said solvent is a compound selected from the group consisting of glycols, polyols and polyethers, and said treating is carried out at temperature ranging from about 100° to about 250° C.

21. A process for decomposing and dissolving polyurethane which comprises passing a stream of ammonia gas through a solvent selected from the group consisting of glycols, polyols and polyethers, heated to a temperature ranging from about 100° to about 250° C., in the absence of water, adding polyurethane to said heated solvent and decomposing said polyurethane with said ammonia and completely liquefying said polyurethane, and recovering the resulting solution containing the decomposition products of said polyurethane and containing polyol.

22. The process as defined in claim 21, wherein said treating is carried out at temperature ranging from about 150° to about 230° C.

23. The process as defined in claim 22, wherein said solvent is a polyol selected from the group consisting of ethylene glycol, propylene glycol, and polyethylene and polypropylene glycols of molecular weight ranging from about 100 to about 5,000, and the adducts of propylene oxide with sorbitol and propylene oxide with etheylene diamine.

24. The process as defined in claim 23, the concentration of ammonia in said solvent ranging from about 0.1 to about 40% by weight of the solution.

25. The process as defined in claim 24, the proportion of ammonia to polyurethane employed ranging from about 0.1 to about 30% by weight.

26. The process as defined in claim 25, said decomposition reaction taking place for a period ranging from about 1 to about 15 minutes.

27. The process as defined in claim 2, including reacting the resulting reaction mixture following treatment of said polyurethane, with polyisocyanate to produce polyurethane.

28. The process as defined in claim 1, including adding the resulting reaction mixture following treatment of said polyurethane, to a polyol reactant for producing polyurethane resin, and reacting the resulting polyol mixture with polyisocyanate to produce polyurethane.

29. The process as defined in claim 8, including adding the resulting reaction mixture following treatment of said polyurethane, to a polyol reactant for producing polyurethane resin, and reacting the resulting polyol mixture with polyisocyanate to produce polyurethane.

30. The process as defined in claim 29, wherein said polyol reactant is a polyalkylene ether polyol and said polyisocyanate is selected from the group consisting of the 2,4- and 2,6-toluene diisocyanates, and polyphenyl polymethylene polyisocyanate.

31. The process for decomposing and dissolving scrap polyurethane and employing the resulting solution for production of fresh polyurethane, which comprises contacting said scrap polyurethane with ammonia in the absence of water, said ammonia selected from the group consisting of ammonia gas and anhydrous ammonia, in an organic solvent having a boiling point of at least 100° C., at a temperature ranging from about 100° to about 250° C., completely liquefying said polyurethane, and reacting the resulting reaction mixture with polyisocyanate to produce fresh polyurethane.

32. The process as defined in claim 31, including adding the reaction mixture containing the dissolved depolymerized products of said scrap polyurethane to a polyol reactant, and reacting the resulting mixture with polyisocyanate to produce fresh polyurethane.

33. The process as defined in claim 32, wherein said solvent is a compound selected from the group consisting of glycols, polyols and polyethers.

34. The process as defined in claim 33, the concentration of ammonia in said solvent ranging from about 0.1 to about 40% by weight of the solution, the proportion of ammonia to polyurethane employed ranging from about 0.1 to about 30% by weight.

35. The process as defined in claim 34, said temperature ranging from about 150° to about 230° C.

36. The process as defined in claim 35, wherein said polyol reactants is a polyalkylene ether polyol and said polyisocyanate is selected from the group consisting of the 2,4- and 2,6-toluene diisocyanates, and polyphenyl polymethylene polyisocyanate.

37. A composition for decomposing polyurethane, comprising a mixture of ammonia, and a high boiling organic solvent selected from the group consisting of glycols, polyethers, polyols, mono- and polyalcohols, phenols, alkoxy benzenes, hydrocarbons and chlorinated hydrocarbons in the absence of water.

38. A composition as defined in claim 37, wherein said solvent is a compound selected from the group consisting of glycols, polyols and polyethers.

39. A composition as defined in claim 38, wherein said solvent is a polyol selected from the group consisting of ethylene glycol, propylene glycol, and polyethylene glycol and polypropylene glycols of molecular weight ranging from about 100 to about 5,000, and the adducts of propylene oxide with sorbitol and propylene oxide with ethylene diamine.

40. A composition as defined in claim 37, said ammonia being present in said solvent in a concentration ranging from about 0.1 to about 40% by weight of the solution.

41. A solvent composition as defined in claim 39, said ammonia being present in said solvent in a concentration ranging from about 0.1 to about 40% by weight of the solution.

* * * * *

UNITED STATES PATENT OFFICE
CERTIFICATE OF CORRECTION

Patent No. 4,162,995          Dated July 31, 1979

Inventor(s) Martin B. Sheratte

It is certified that error appears in the above-identified patent and that said Letters Patent are hereby corrected as shown below:

On the cover sheet Item [73] should read:
--- McDonnell Douglas Corporation ---.

Signed and Sealed this

Twenty-fifth Day of March 1980

[SEAL]

Attest:

SIDNEY A. DIAMOND

*Attesting Officer*      *Commissioner of Patents and Trademarks*